UNITED STATES PATENT OFFICE.

FREDERICK W. YOST, OF CHICAGO, ILLINOIS.

PROCESS OF TREATING MATERIALS.

1,003,682.

Specification of Letters Patent.

Patented Sept. 19, 1911.

No Drawing. Application filed June 11, 1909, Serial No. 501,561. Renewed January 16, 1911. Serial No. 602,978.

*To all whom it may concern:*

Be it known that I, FREDERICK W. YOST, a citizen of the United States, residing at Chicago, in the county of Cook and State of Illinois, have invented certain new and useful Improvements in Processes of Treating Materials, of which the following is a specification.

My invention relates to the treatment of materials; and it comprises a process wherein a reaction initiated in one region of a mass of material is caused to propagate through the mass by proper control of conditions and by the aid of a reaction-supporting gas conducted through the interior of the mass in a direction other than the course of reaction; and it also comprises more particularly, but not exclusively, the treatment of finely divided material in a stationary or movable mass by roasting, calcining or reducing and agglomerating one or more of the contained elements, all as more fully hereinafter set forth and as claimed.

One of the chief objects attained by my invention is the high efficiency of the process, because the gaseous element is brought to the zone of reaction uncontaminated by the products of reaction, since the reaction producing gas is conducted through the material in a direction other than the course of reaction. And since the waste products of reaction are not conducted through the untreated material the reaction is susceptible of full control, because the untreated material is acted upon only by the energy developed at the zone of reaction.

Another important object attained is the lengthened life of any apparatus employed, because in my process the volatile products escape from the interior of the mass at the same surface at which the reaction is initiated, therefore, the destructive agencies are all confined to one region of the apparatus and that part of the apparatus may be formed of material largely uninfluenced by such agencies.

A further attainment is the economical and rapid treatment of the material caused by the intimate contact between the particles of the mass and the reaction-supporting gas.

My process can be carried on intermittently in the well known forms of pot roasting apparatus or in any reverberatory roasting furnace provided with a perforated hearth, or continuously in well known forms of chain grate stoker furnaces, where the material can be treated in a mass having definite bounding surfaces.

My process may be advantageously used for roasting sulfid ores and related materials, where, as is usual in the art, sulfids are to be oxidized to form either a granular or an agglomerated body of oxids. It has been the practice heretofore to roast many of these ores in some form of reverberatory furnace, where heating and roasting of the charge are chiefly brought about by agitation of the ore mass thus forming and exposing new surfaces to the hot furnace gases, but it is impossible by this method to heat and oxidize uniformly all the particles of the charge. Recent improvements provide for the passage of air or other gases through the ore mass, but the heating of the charge nevertheless lacks uniformity, because the heating still depends upon the continual formation of new surfaces by rabbling. The various developments of the heap roasting process are also largely used for roasting sulfid ores. In the earlier forms of the process a large mass of ore is ignited at the bottom and natural draft, which is subject to slight control, propagates combustion toward the top, the products of combustion from one region passing through adjacent regions and materially interfering with the combustion in those regions, with the result that some portions of the heap are over-burned and clinkered and other portions are under-burned and retain much sulfur. In the later developments of the heap roasting process, variously called lime roasting, pot roasting, and blast roasting, a controlled air blast is introduced at the ignited surface of the charge, whereby combustion is propagated in the direction of the blast through the interior of the ore mass, and sintering, which is the chief function, is almost simultaneous with combustion, therefore, there is no separate control of the roast reaction.

In my process when applied to sulfid ores the finely divided ore is charged into any suitable apparatus, and air, introduced at the lower surface of the charge, is conducted upward through the interior of the mass, the opposite surface of the charge is ignited and the heat, followed by the oxidation of sulfids, is propagated by internal combustion downward, the plane of ignition passing downward through the charge from the upper to the lower surface, or passing backward against the flow of the air, while the volatile products of combustion escape at the upper surface without interfering with the reactions in the zone of combustion. The regulation and exact control of chemical, thermal and other conditions in the zone of combustion is therefore simple and practicable. If there is sufficient sulfur in the material for self-supporting combustion, after ignition, the process can be carried on in an open top receptacle; if there is not sufficient sulfur to support continuous combustion the process can be carried on in a reverberatory furnace with a perforated hearth, or in a suitable form of chain grate stoker furnace, where a moving body of hot gases generated by the combustion of extraneous fuel, can be maintained in contact with the upper surface of the charge. Where the material is deficient in sulfur it may be necessary, and is frequently advantageous to add combustible elements to the charge so that the heat may be propagated more efficiently through the mass. It may be desirable to moisten the charge so as to form interstices for the uniform distribution of the air through the mass. The temperature in the zone of reaction may be regulated, or the character of the reaction may be varied, by the addition of steam or other modifying element to the air conducted through the interior of the mass.

An agglomerated product may be made, provided the elimination of sulfur to the lowest attainable degree is not required, by adding a suitable combustible element to the material of the charge or to the air conducted through the interior of the mass, or by heating the air conducted through the interior of the mass, or by various other means which will properly intensify the reaction in the zone of combustion. Whether the final product is to be granular or agglomerated, the conditions relating to the composition of the charge, the composition and temperature of the igniting or heating gases, the composition, temperature and pressure of the combustion-supporting gas, etc., must be properly correlated, to produce the particular result desired, and each of these conditions must be properly controlled to propagate the desired reaction through the charge in the desired manner. My process also may be used for burning or calcining limestone, bauxite, or similar material, where the chief object is the elimination of combined water and the decomposition of carbonates. Such material, when in lump form, is commonly calcined in a vertical stack where the fuel is burned either in contact with the charge or in a separate furnace, but in either case the calcining gases, when they reach the zone of reaction, are largely vitiated by products of combustion. Such material, in smaller form, is sometimes calcined in a rotary kiln where there is a large waste of fuel, because the hot gases act usefully only upon the small amount of material lying on the bottom of the kiln the entire upper part of which forms an unobstructed flue permitting the gases to pass without hindrance to the stack.

In my process when applied to limestone or similar material, the finely divided material is intimately mixed with combustible elements and is charged into a reverberatory furnace provided with a perforated hearth or into a suitable form of chain grate stoker furnace. Air, introduced at the lower surface of the charge, is conducted upward through the interior of the mass, the oposite surface of the charge is heated by contact with the hot furnace gases, generated by the combustion of extraneous fuel, and the heat, followed by the elimination of combined water and the decomposition of carbonates, is propagated by internal reaction downward through the charge from the upper to the lower surface while the volatile products escape at the upper surface and join the furnace gases. The intermixed fuel in any region is consumed by the internal reaction only when the hot combustion zone, in its downward progress, reaches that region and the small particles of fuel release their heat only at the time and at the place when and where it is needed. In this case also, it may be desirable to moisten the charge to make it more porous, and likewise, modifying elements may be added to the air conducted through the interior of the mass to control the temperature at the zone of reaction or to vary the character of the reaction. Where the ash from the combustion of solid fuel is an undesirable ingredient of the calcined product, liquid or semi-liquid fuel may be used as an element of the charge. The character of the reaction or the composition of the finished product may be modified by the addition to the charge of suitable fluxes. For some purposes it may be necessary to prevent sintering of the calcined product while for other purposes it may be desirable that the product be slightly sintered, and either of these results can be obtained by modifications outlined above.

My process is well adapted for the production of sponge iron by reducing and agglomerating iron oxid ores or related metal bearing material. The finely divided ore is intimately mixed with combustible elements and is charged into a reverberatory furnace provided with a perforated hearth or into a suitable form of chain grate stoker furnace. A combustible gas, such as blast furnace gas or producer gas, introduced at the lower surface of the charge, is conducted upward through the interior of the mass, the opposite surface of the charge is heated by contact with the moving body of hot furnace gases and the heat, followed by the reduction of oxids and the agglomeration of ore particles, is propagated by internal reaction downward through the charge from the upper to the lower surface while the volatile products and gases formed from the components of the charge escape at the upper surface, where their complete combustion adds to the temperature and volume of the furnace gases. An essential part of this treatment is the maintenance of highly reducing conditions in the interior of the mass; these conditions may be secured by the use of smaller proportions of the heat-developing components in the charge with larger volumes of combustible gas conducted through the mass or with larger proportions of the heat developing components in the charge with smaller volumes of combustible gas conducted through the mass. The degree of reduction may be controlled by the addition of steam, or other modifying element, to the combustible gas conducted through the interior of the mass. When the chief object is the making of an agglomerated product, and when it is desired to reduce the oxids only to such a degree as may be required to initiate the agglomerating reaction, hot or cold air may be conducted through the interior of the mass instead of combustible gas. In this case an important feature of the treatment is to maintain in the interior of the charge the least degree of reduction that will initiate the agglomerating reaction and this condition may be secured by the use of cold air together with a reducing furnace flame and a minimum of carbonaceous material in the charge or by the use of hot air together with an oxidizing furnace flame and a minimum of carbonaceous material in the charge. The reaction may be further controlled by the addition to the air of steam or other modifying element.

I do not wish to be limited to treatment of the specific materials described in the examples set forth, nor do I wish to be limited to the specific details of treatment there described, nor merely to the specific process described, since it will be evident to those skilled in the art that this invention applies to the treatment of any material, or any mixture of materials, of such a nature that a reaction started in one region of a mass can be propagated through the whole mass by proper control of chemical, thermal and other conditions. It will be further evident that the kinds of treatment accorded the material are not limited to roasting, calcining or reducing and agglomerating, but may include any treatment which produces either an endothermic or exothermic reaction. It also will be evident that the gaseous element can vary widely as to composition, and may be either an oxidizing or reducing agent, provided, that under suitable control of conditions, it has the property of aiding in propagating the reaction through the interior of the mass in a direction other than the course of the gaseous element.

In all of the examples set forth I have described a downward propagation of the reaction and an upward course for the reaction-supporting gas but for different conditions I may prefer to propagate the reaction upward, or in any other direction, provided the gaseous element is conducted in a direction other than the course of reaction. I also have described, in the examples set forth, conditions which result in the formation of volatile products of reaction, but it will be evident that non-volatile products of reaction will be formed when the reaction is of such a character that the gaseous element conducted through the interior of the mass is absorbed by material of the charge.

It is to be understood that the words, "finely divided", as herein used, have reference to any degree of subdivision that best adapts the material to treatment by my process, as some materials respond to treatment better when in a relatively coarse condition while other materials respond to treatment only when in a finely divided state. It is to be also understood, that where the material is described in the claims as containing various components, the various components may be originally contained in the material, or they may be added to the material to prepare it for treatment.

What I claim is:

1. The process of treating finely divided material containing heat developing components, which comprises initiating a reaction at one surface of a mass of material having definite bounding surfaces and capable of undergoing a propagative reaction, said mass being of substantially uniform character throughout, introducing a reaction-supporting gas at another surface of the mass, conducting the reaction-supporting gas through the interstices of the mass, and controlling conditions so as to cause an internal propagation of the reaction through the body of such mass, substantially as described.

2. The process of treating finely divided material containing heat developing components, which comprises initiating a reaction at one surface of a mass of material having definite bounding surfaces and capable of undergoing a propagative reaction, said mass being of substantially uniform character throughout, introducing a reaction-supporting gas at another surface of the mass, conducting the reaction-supporting gas through the interstices of the mass, controlling conditions so as to cause an internal propagation of the reaction throughout the body of such mass, and withdrawing the volatile products of reaction at the surface of initial reaction, substantially as described.

3. The process of treating finely divided material containing heat developing components, which comprises initiating a reaction at one surface of a mass of material having definite bounding surfaces and capable of undergoing a propagative reaction, said mass being of substantially uniform character throughout, introducing a reaction-supporting gas at the opposite surface of the mass, conducting the reaction-supporting gas through the interstices of the mass, controlling conditions so as to cause an internal propagation of the reaction throughout the body of such mass, and withdrawing the volatile products of reaction at the surface of initial reaction, substantially as described.

4. The process of treating finely divided material containing gas forming components, which comprises initiating a reaction at one surface of a mass of material having definite bounding surfaces and capable of undergoing a propagative reaction, said mass being of substantially uniform character throughout, introducing a reaction-supporting gas at another surface of the mass, conducting the reaction-supporting gas through the interstices of the mass, and controlling conditions so as to cause an internal propagation of the reaction throughout the body of such mass, substantially as described.

5. The process of treating finely divided material containing gas forming components, which comprises initiating a reaction at one surface of a mass of material having definite bounding surfaces and capable of undergoing a propagative reaction, said mass being of substantially uniform character throughout, introducing a reaction-supporting gas at another surface of the mass, conducting the reaction-supporting gas through the interstices of the mass, controlling conditions so as to cause an internal propagation of the reaction throughout the body of such mass, and withdrawing the volatile products of reaction at the surface of initial reaction, substantially as described.

6. The process of treating finely divided material containing gas forming components, which comprises initiating a reaction at one surface of a mass of material having definite bounding surfaces and capable of undergoing a propagative reaction, said mass being of substantially uniform character throughout, introducing a reaction-supporting gas at the opposite surface of the mass, conducting the reaction-supporting gas through the interstices of the mass, controlling conditions so as to cause an internal propagation of the reaction throughout the body of such mass, and withdrawing the volatile products of reaction at the surface of initial reaction, substantially as described.

7. The process of treating finely divided material containing heat developing components, which comprises heating one surface of a mass of material having definite bounding surfaces and capable of undergoing a propagative reaction, said mass being of substantially uniform character throughout, introducing a reaction-producing gas at another surface of the mass, conducting the reaction-producing gas through the interstices of the mass, and controlling conditions so as to propagate the heat throughout the body of such mass by an internal reaction, substantially as described.

8. The process of treating finely divided material containing heat developing components, which comprises heating one surface of a mass of material having definite bounding surfaces and capable of undergoing a propagative reaction, said mass being of substantially uniform character throughout, introducing a reaction-producing gas at another surface of the mass, conducting the reaction-producing gas through the interstices of the mass, controlling conditions so as to propagate the heat throughout the body of such mass by an internal reaction, and withdrawing the volatile products of reaction at the surface of initial heat, substantially as described.

9. The process of treating finely divided material containing heat developing components, which comprises heating one surface of a mass of material having definite bounding surfaces and capable of undergoing a propagative reaction, said mass being of substantially uniform character throughout, introducing a reaction-producing gas at the opposite surface of the mass, conducting the reaction producing gas through the interstices of the mass, controlling conditions so as to propagate the heat throughout the body of such mass by an internal reaction, and withdrawing the volatile products of reaction at the surface of initial heat, substantially as described.

10. The process of treating finely divided material containing heat developing components, which comprises heating the upper surface of a mass of material having definite bounding surfaces and capable of undergoing a propagative reaction, said mass being of substantially uniform character throughout, introducing a reaction-producing gas at the lower surface of the mass, conducting the reaction-producing gas upward through the interstices of the mass, controlling conditions so as to propagate the heat downward throughout the body of such mass by an internal reaction, and withdrawing the volatile products of reaction at the surface of initial heat, substantially as described.

11. The process of treating finely divided material containing gas forming components, which comprises heating one surface of a mass of material having definite bounding surfaces and capable of undergoing a propagative reaction, said mass being of substantially uniform character throughout, introducing a reaction-producing gas at another surface of the mass, conducting the reaction-producing gas through the interstices of the mass, and controlling conditions so as to propagate the heat throughout the body of such mass by an internal reaction, substantially as described.

12. The process of treating finely divided material containing gas forming components, which comprises heating one surface of a mass of material having definite bounding surfaces and capable of undergoing a propagative reaction, said mass being of substantially uniform character throughout, introducing a reaction-producing gas at another surface of the mass, conducting the reaction-producing gas through the interstices of the mass, controlling conditions so as to propagate the heat throughout the body of such mass by an internal reaction, and withdrawing the volatile products of reaction at the surface of initial heat, substantially as described.

13. The process of treating finely divided material containing gas forming components, which comprises heating one surface of a mass of material having definite bounding surfaces and capable of undergoing a propagative reaction, said mass being of substantially uniform character throughout, introducing a reaction-producing gas at the opposite surface of the mass, conducting the reaction-producing gas through the interstices of the mass, controlling conditions so as to propagate the heat throughout the body of such mass by an internal reaction, and withdrawing the volatile products of reaction at the surface of initial heat, substantially as described.

14. The process of treating finely divided material containing gas forming components, which comprises heating the upper surface of a mass of material havng definite bounding surfaces and capable of undergoing a propagative reaction, said mass being of substantially uniform character throughout, introducing a reaction-producing gas at the lower surface of the mass, conducting the reaction-producing gas upward through the interstices of the mass, controlling conditions so as to propagate the heat downward throughout the body of such mass by an internal reaction, and withdrawing the volatile products of reaction at the surface of initial heat, substantially as described.

15. The process of treating finely divided material containing combustible components, which comprises heating one surface of a mass of material having definite bounding surfaces and capable of undergoing a propagative reaction, said mass being of substantially uniform character throughout, introducing a combustion-supporting gas at another surface of the mass, conducting the combustion-supporting gas through the interstices of the mass, and controlling conditions so as to propagate the heat throughout the body of such mass by internal combustion, substantially as described.

16. The process of treating finely divided material containing combustible components, which comprises heating one surface of a mass of material having definite bounding surfaces and capable of undergoing a propagative reaction, said mass being of substantially uniform character throughout, introducing a combustion-supporting gas at another surface of the mass, conducting the combustion-supporting gas through the interstices of the mass, controlling conditions so as to propagate the heat throughout the body of such mass by internal combustion, and withdrawing the volatile products of combustion at the surface of initial heat, substantially as described.

17. The process of treating finely divided material containing combustible components, which comprises heating one surface of a mass of material having definite bounding surfaces and capable of undergoing a propagative reaction, said mass being of substantially uniform character throughout, introducing a combustion-supporting gas at the opposite surface of the mass, conducting the combustion-supporting gas through the interstices of the mass, controlling conditions so as to propagate the heat throughout the body of such mass by internal combustion, and withdrawing the volatile products of combustion at the surface of initial heat, substantially as described.

18. The process of treating finely divided material containing combustible components, which comprises heating the upper surface of a mass of material having definite bounding surfaces and capable of undergoing a propagative reaction, said mass being of substantially uniform character throughout, introducing a combustion-supporting gas at the lower surface of the mass, conducting the combustion-supporting gas upward through the interstices of the mass, controlling conditions so as to propagate the heat downward throughout the body of such mass by internal combustion, and withdrawing the volatile products of combustion at the upper surface, substantially as described.

19. The process of treating finely divided material containing heat developing components, which comprises transmitting heat from a moving body of hot gases to one surface of a mass of material capable of undergoing a propagative reaction, introducing a reaction-producing gas at another surface of the mass, conducting the reaction-producing gas through the interstices of the mass, and controlling thermal and other conditions so as to propagate the heat throughout the body of such mass by an internal reaction, substantially as described.

20. The process of treating finely divided material containing heat developing components, which comprises transmitting heat from a moving body of hot gases to one surface of a mass of material capable of undergoing a propagative reaction, introducing a reaction-producing gas at the opposite surface of the mass, conducting the reaction-producing gas through the interstices of the mass, controlling thermal and other conditions so as to propagate the heat throughout the body of such mass by an internal reaction, and withdrawing the volatile products of reaction at the surface of initial heat, substantially as described.

21. The process of treating finely divided material containing heat developing components, which comprises transmitting heat from a moving body of hot gases to the upper surface of a mass of material capable of undergoing a propagative reaction, introducing a reaction-producing gas at the lower surface of the mass, conducting the reaction-producing gas upward through the interstices of the mass, controlling thermal and other conditions so as to propagate the heat downward throughout the body of such mass by an internal reaction, and withdrawing the volatile products of reaction at the upper surface, substantially as described.

22. The process of treating finely divided material containing gas forming components, which comprises transmitting heat from a moving body of hot gases to one surface of a mass of material capable of undergoing a propagative reaction, introducing a reaction-producing gas at another surface of the mass, conducting the reaction-producing gas through the interstices of the mass, and controlling thermal and other conditions so as to propagate the heat throughout the body of such mass by an internal reaction, substantially as described.

23. The process of treating finely divided material containing gas forming components, which comprises transmitting heat from a moving body of hot gases to one surface of a mass of material capable of undergoing a propagative reaction, introducing a reaction-producing gas at the opposite surface of the mass, conducting the reaction-producing gas through the interstices of the mass, controlling thermal and other conditions so as to propagate the heat throughout the body of such mass by an internal reaction, and withdrawing the volatile products of reaction at the surface of initial heat, substantially as described.

24. The process of treating finely divided material containing gas forming components, which comprises transmitting heat from a moving body of hot gases to the upper surface of a mass of material capable of undergoing a propagative reaction, introducing a reaction-producing gas at the lower surface of the mass, conducting the reaction-producing gas upward through the interstices of the mass, controlling thermal and other conditions so as to propagate the heat downward throughout the body of such mass by an internal reaction, and withdrawing the volatile products of reaction at the upper surface, substantially as described.

25. The process of treating finely divided material containing combustible components, which comprises transmitting heat from a moving body of hot gases to one surface of a mass of material capable of undergoing a propagative reaction, introducing a combustion-supporting gas at another surface of the mass, conducting the combustion-supporting gas through the interstices of the mass, and controlling thermal and other conditions so as to propagate the heat throughout the body of such mass by internal combustion, substantially as described.

26. The process of treating finely divided material containing combustible components, which comprises transmitting heat from a moving body of hot gases to one surface of a mass of material capable of undergoing a propagative reaction, introducing a combustion-supporting gas at the opposite surface of the mass, conducting the combustion-supporting gas through the interstices of the mass, controlling thermal and other conditions so as to propagate the heat throughout the body of such mass by internal combustion, and withdrawing the volatile products of combustion at the surface of initial heat, substantially as described.

27. The process of treating finely divided material containing combustible components, which comprises transmitting heat from a moving body of hot gases to the upper surface of a mass of material capable of undergoing a propagative reaction, introducing a combustion-supporting gas at the lower surface of the mass, conducting the combustion-supporting gas upward through the interstices of the mass, controlling thermal and other conditions so as to propagate the heat downward throughout the body of such mass by internal combustion, and withdrawing the volatile products of combustion at the upper surface, substantially as described.

28. The process of treating finely divided material containing combustible and other components, which comprises transmitting heat from a moving body of hot gases to the upper surface of a mass of material capable of undergoing a propagative reaction, introducing a gas reactive with some of the components of the material at the lower surface of the mass, conducting the reactive gas upward through the interstices of the mass, controlling thermal and other conditions so as to propagate the heat downward throughout the body of such mass by internal combustion, and withdrawing the volatile products of combustion at the upper surface, substantially as described.

29. The process of treating finely divided material containing carbonaceous components, which comprises transmitting heat from a moving body of hot gases to the upper surface of a mass of material capable of undergoing a propagative reaction, introducing a combustion-supporting gas at the lower surface of the mass, conducting the combustion-supporting gas upward through the interstices of the mass, controlling thermal and other conditions so as to propagate the heat downward throughout the body of such mass by internal combustion, and withdrawing the volatile products of combustion at the upper surface, substantially as described.

30. The process of treating finely divided material containing combustion-supporting and other components, which comprises transmitting heat from a moving body of hot gases to the upper surface of a mass of material capable of undergoing a propagative reaction, introducing a gas reactive with some of the components of the material at the lower surface of the mass, conducting the reactive gas upward through the interstices of the mass, controlling thermal and other conditions so as to propagate the heat downward throughout the body of such mass by internal combustion, and withdrawing the volatile products of combustion at the upper surface, substantially as described.

31. The process of treating finely divided material containing reactive components, which comprises transmitting heat from a moving body of hot gases to the upper surface of a mass of material capable of undergoing a propagative reaction, introducing a gas which is reactive with some of the components of the material at the lower surface of the mass, conducting the reactive gas upward through the interstices of the mass, controlling thermal and other conditions so as to propagate the heat downward throughout the body of such mass by an internal reaction, and withdrawing the volatile products of reaction at the upper surface, substantially as described.

32. The process of treating granular material capable of undergoing propagative reaction, which comprises initiating a propagative reaction at one surface of a mass of material having definite bounding surfaces, said mass being of substantially uniform character throughout, transmitting a current of reaction-supporting gas through the mass toward the surface of initial reaction, and controlling conditions so as to cause the propagative reaction to travel inward through the interstices in the body of the mass in a direction other than the flow of the reaction-supporting gas, substantially as described.

33. The process of treating material containing combustible components, which comprises producing ignition in a mass of material having definite bounding surfaces and capable of undergoing a propagative reaction, said mass being of substantially uniform character throughout, feeding a gas current through the interstices in the mass, and controlling conditions so as to cause a backward propagation of the plane of ignition against the flow of the gas current by means of a reaction internal to the mass, substantially as described.

34. The process of treating finely divided material capable of undergoing agglomerative reaction, which comprises initiating an agglomerating reaction at one surface of a mass of the material, said mass being of substantially uniform character throughout, transmitting a current of reaction-supporting gas through the mass toward the surface of initial reaction, and controlling conditions so as to cause the agglomerating reaction to travel inward through the interstices in the body of the mass in a direction other than the flow of the reaction-supporting gas, substantially as described.

35. The process of treating finely divided material containing heat developing components and capable of undergoing agglomerative reaction, which comprises initiating an agglomerating reaction at one surface of a mass of the material, said mass being of substantially uniform character throughout, introducing a combustion-supporting gas at another surface of the mass, conducting the combustion-supporting gas through the interstices of the mass, and controlling conditions so as to propagate the agglomerating reaction through the mass by internal combustion, substantially as described.

36. The process of treating finely divided material containing combustible components and capable of undergoing agglomerative reaction, which comprises transmitting heat from a body of hot gases to the upper surface of a movable mass of the material, said mass being of substantially uniform character throughout, introducing a combustion-supporting gas at the lower surface of the movable mass, conducting the combustion-supporting gas upward through the interstices of the movable mass, and controlling thermal and other conditions so as to propagate an agglomerating reaction downward through the movable mass by internal combustion, substantially as described.

37. The process of continuously treating finely divided material containing combustible components and capable of undergoing agglomerative reaction, which comprises continuously feeding the material to the moving perforated hearth of a reverberatory furnace to form a moving mass of the material, continuously transmitting heat from a body of hot gases to the upper surface of the moving mass, continuously introducing a combustion-supporting gas at the lower surface of the moving mass, continuously conducting the combustion-supporting gas upward through the interstices of the moving mass, and controlling thermal and other conditions so as to continuously propagate an agglomerating reaction downward through the moving mass by internal combustion, substantially as described.

38. The process of continuously treating finely divided iron oxid, which comprises mixing with the iron oxid the minimum quantity of finely divided fuel required to form a mixture capable of undergoing agglomerative reaction; continuously feeding the mixture to the moving perforated hearth of a reverberatory furnace to form a moving mass; continuously transmitting heat from a body of hot gases to the upper surface of the moving mass; and continuously conducting a combustion-supporting gas upward through the moving mass; the conditions relating to the composition of the iron oxid mixture, the composition and temperature of the hot gases, and the composition, temperature and pressure of the combustion-supporting gas being so correlated as to continuously initiate an agglomerating reaction at the upper surface of the moving mass, and so as to continuously propagate the agglomerating reaction downward through the moving mass.

In testimony whereof I have hereunto set my hand this eighth day of June, 1909, in the presence of two witnesses.

FREDERICK W. YOST.

Witnesses:
RALPH McMILLAN,
EDWARD A. BERN.